No. 677,308. Patented June 25, 1901.
R. EICKEMEYER, Dec'd.
C. EICKEMEYER, M. T. EICKEMEYER & R. EICKEMEYER, Jr., Executors.
ALTERNATING CURRENT MOTOR.
(Application filed Jan. 24, 1901.)
(No Model.) 2 Sheets—Sheet 2.
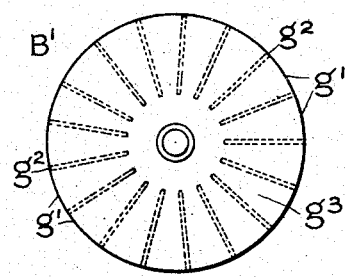
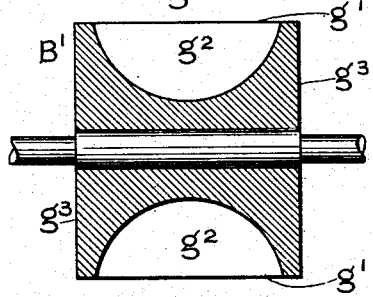
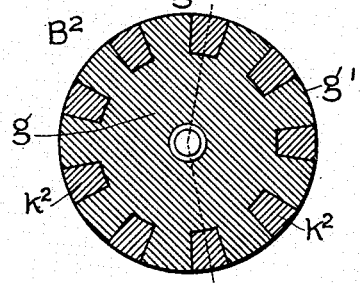
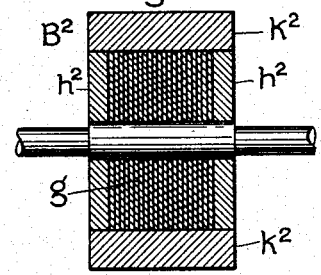
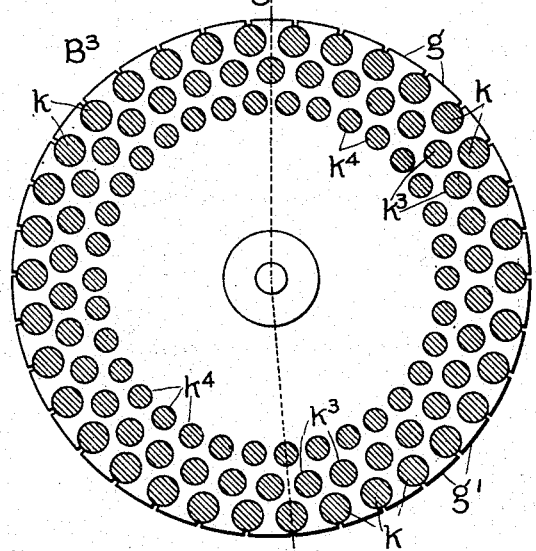
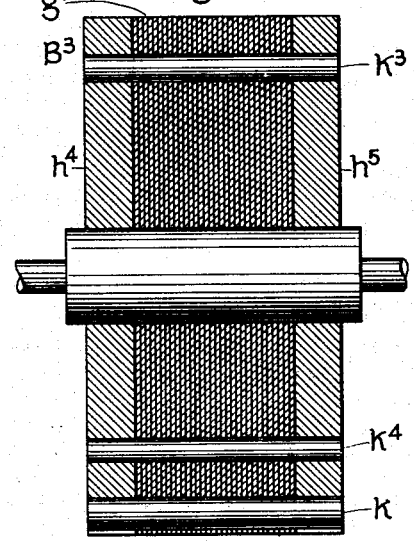
Witnesses.
Inventor
Carl Eickemeyer,
Mary T. Eickemeyer,
and Rudolf Eickemeyer Jr.
Executors of
Rudolf Eickemeyer,
Deceased,
by _____ Atty.

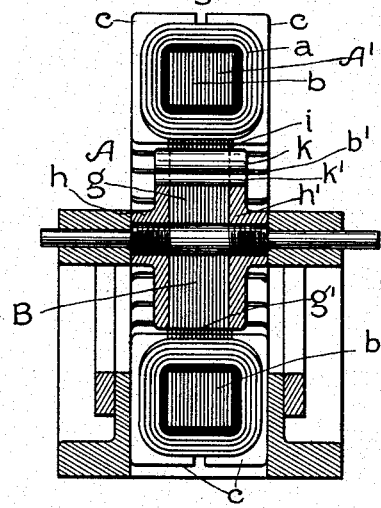
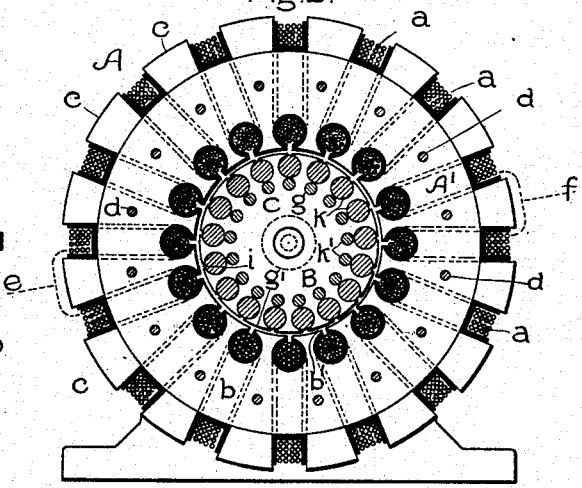
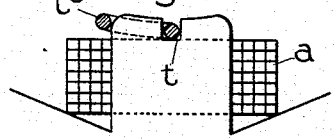
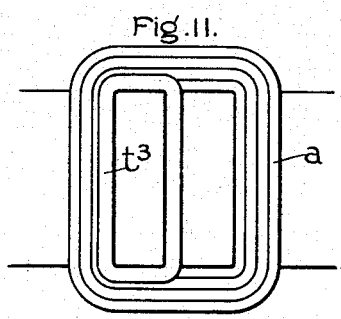
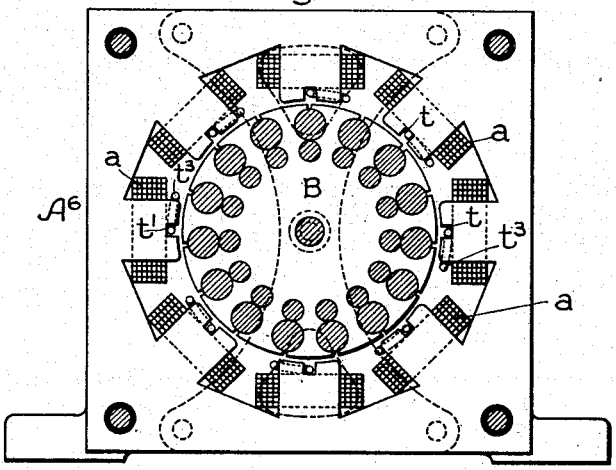
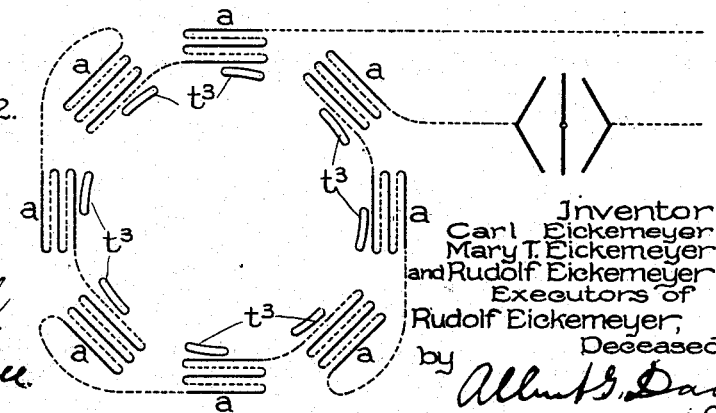

UNITED STATES PATENT OFFICE.

CARL EICKEMEYER, MARY T. EICKEMEYER, AND RUDOLF EICKEMEYER, JR., OF YONKERS, NEW YORK, EXECUTORS OF RUDOLF EICKEMEYER, DECEASED, ASSIGNORS TO THE GENERAL ELECTRIC COMPANY, OF SCHENECTADY, NEW YORK.

ALTERNATING-CURRENT MOTOR.

SPECIFICATION forming part of Letters Patent No. 677,308, dated June 25, 1901.

Original application filed July 6, 1894, Serial No. 516,724. Divided and this application filed January 24, 1901. Serial No. 44,576. (No model.)

*To all whom it may concern:*

Be it known that RUDOLF EICKEMEYER, deceased, late of Yonkers, in the county of Westchester and State of New York, during his lifetime invented certain new and useful Improvements in Alternating-Current Motors, and that we, CARL EICKEMEYER, MARY T. EICKEMEYER, and RUDOLF EICKEMEYER, Jr., executors under the last will and testament of the said RUDOLF EICKEMEYER, do hereby declare to the best of our knowledge and belief that the following specification, taken in connection with the drawings furnished and forming a part of the same, is a clear, true, and complete description of said improvements.

This application is a division of application Serial No. 516,724, filed July 6, 1894.

The improvements hereinafter set forth relate to motors adapted for use in electric circuits wherein the current alternates.

The armatures of the motors embody iron cores with tightly-inserted longitudinal copper conductors and copper heads and are novel in that said parts are so organized and united by soldering as to constitute a substantially integral solid structure and afford the desired number of closed circuits, which are traversed by currents induced by the rotation of the armature through and by the alternations of the magnetic field. In armatures of this type the longitudinal conductors are angularly arranged and in one or more concentric rows so disposed in the iron core as to separate parts of it into sections divided substantially on radial lines extending from the periphery inwardly, also in having the field-poles and the longitudinal conductors unsymmetrical with relation to each other, so that no two magnet-poles can ever have a magnetic circuit (through portions of the core) which is precisely the same as that of any other two poles, and also in having the plugs (or longitudinal conductors) and poles located unsymmetrically, so that no two adjacent plugs will occupy the same position with relation to their adjacent pole or poles as any other two similar plugs will occupy with relation to their adjacent pole or poles, the object being by these several features of construction to reduce the magnetic resistance of the armature to the lowest practicable degree; and for affording specially ample magnetic circuits and numerous closed circuits in the armature-core I arrange the plugs in concentric rows or sets, so that the plugs in some of the rows will occupy different radial lines from those occupied by the other plugs.

Referring to the drawings, Figures 1 and 2 illustrate in two diametrically opposite sections an alternating-current machine embodying certain portions of the invention. Figs. 3 and 4, in end view and longitudinal sections, illustrate a closed-circuit armature as devised and used in one of its simplest forms. Figs. 5 and 6, in two sections, illustrate an armature embodying an iron core, copper heads, and inserted copper bars in accordance with one portion of the invention. Figs. 7 and 8, in two sections, illustrate still another of the armatures, having an iron core, copper head, and three rows of inserted copper plugs. Figs. 9, 10, 11, and 12 illustrate a motor having a closed-circuit armature like that in Fig. 1 and a field of suitable form provided with closed-circuit starting-coils in the form of solid conductors, in part occupying recesses in the cores of the field.

The machine A (shown in Figs. 1 and 2) has a field-magnet or inducing member A', which contains sixteen field-coils $a$ on a ring or core composed of soft-iron plates $b$, the latter being laterally bored to receive the inner ends of the coils, which are otherwise maintained in position by wedge-shaped blocks $c$, interposed between the coils at their sides and outer ends, the blocks and core-plates being clamped together by means of pins or bolts $d$. The bored holes in the core are slitted through to the armature-space, as at $b'$, for affording air-space between the pole-divisions or pole-faces of the field-magnets, of which there are sixteen intervening between the sixteen coils. In this machine, as operated in accordance with the invention, the main circuit or supply connections are made with the set of field-coils at two opposite points, (indicated at $e$ and $f$,) and the armature B when once started is effectively driven by this bipolar field without any variations in the application of the main current or in the field-coils, although for starting the motor a system of short-circuiting the field-coils or rotation of the field-coil terminals is employed. Since such means for starting do not constitute a basis for claims in this case, no detailed description of the same is deemed necessary.

The armature or induced member B contains certain novel features in its construction by which highly-effective closed electric circuits are afforded, and when considered with reference to its combination with the field described valuable novelty is involved in the fact that the number of closed circuits in the armature is a number which has no numerical relation to the number of field-poles or pole-faces, or, in other words, the sixteen field-coils and pole-faces are here used in combination with an armature provided with seventeen conductors. For causing the armature-poles to revolve with uniformity as to speed and strength the armature-conductors should be numerous, and for securing the best results the magnetic resistance of the armature should be uniform or equal in all directions—that is, the armature must not have any well-defined pole-faces corresponding in number to those of the field. It is to be understood that this portion of the invention extends to any given number of pole-faces in the field and any given number of conductors at the periphery of the armature, so long as said number of conductors is indivisible by the number of field-poles or has no large common divisor therewith.

The armature B includes a core $g$, of soft-iron disks, clamped between two copper heads $h\,h'$. Near the periphery of the drum thus formed it is bored in the line of its axis at seventeen equidistant points, and the metal is also slitted, as at $i$, through the outer side of each hole, thus dividing the face of the armature into seventeen divisions or teeth with intervening air-spaces. Into these holes soft-copper plugs $k$ are tightly inserted. Concentric with these outer holes a corresponding number of smaller holes are bored, each slightly opening into the adjacent large hole. Into these small holes soft-copper plugs $k'$ or pins are fitted, each pair of small and large plugs being in contact with each other and serving in substance as one conductor of such a form as will possess desirable sectional area without unduly reducing the bulk of iron between each pair of the thus-connected conductors, this iron being required for affording magnetic circuits. The copper heads $h\,h'$ and the several plugs or pins $k\,k'$ are then united by solder at all the joints, thus producing an armature which is a practically solid integral structure and one which cannot become injured or impaired by service, and hence need never be dismantled.

Referring to Fig. 2, it will be seen that the magnetic circuit from no one field-pole through the adjacent iron in the armature-core to any other field-pole can ever be precisely the same (in magnetic conductivity) as any other magnetic circuit between any other two field-poles, because of the unsymmetrical relations between said field-poles and the divisions of the iron core near its periphery. Now, referring to the novelty believed to be involved in the armatures devised, it is to be understood that closed-circuit armatures embodying the transverse copper plugs and the copper heads on an iron core embody a portion of the invention regardless of the relation which the number of closed circuits may bear to the number of field-poles or pole-faces. Armatures of this type, although composite, are practically solid structures, the parts being generally solidly united at all points by means of solder or welding, so that the core and the closed-circuit conductors are practically integral, and it is therefore considered that an armature affording equal magnetic resistance in all directions embodies a valuable portion of the invention—for instance, as shown in Figs. 3 and 4. This armature $B'$ is composed wholly of iron, and it may be made up of soft-iron disks or of solid iron either wrought or cast. At its periphery it is radially slitted at regular intervals, as at $g^2$, but leaving the ends $g^3$ of the drum intact, the slots $g^2$ being concave, as shown. In this instance there are seventeen of these slots and a corresponding number of faces $g'$ at the periphery, the closed circuits being afforded in each instance from each of the faces $g'$ to the one or two diametrically opposite (if used with a bipolar field) or from each face $g'$ to such other face or faces as may in each case be appropriate to the polar arrangement of the field. It will be seen that this armature-core if placed in the machine, Figs. 1 and 2, would prevent any one magnetic circuit through the core from any two field-poles from being precisely the same in magnetic conductivity as that of any other two field-poles.

In Figs. 5 and 6 is shown an armature $B^2$, which has a laterally-mortised core $g$, the mortises being open at the periphery and filled with copper bars $k^2$, which project at their ends and occupy mortises in copper heads $h^2\,h^2$. This armature is solid and practically integral, the several joints being flooded with solder or welded together, and the copper heads, as in the armature first described, serve as diametrical conductors.

In Figs. 7 and 8 is shown one of the armatures in one of its best forms so far as relates to its structure. This armature $B^3$ has closed circuits which are afforded by copper heads $h^4\,h^5$ and three annular sets or rows of copper plugs, of which there are thirty-four in each row, the outer plugs $k$ in the slotted holes being larger than those in the middle row $k^3$ and these latter larger than those in the inner row $k^4$. This graduation in the sizes of the plugs in the three sets or rows provides for sufficient intervening iron to afford ample magnetic circuits. In this armature the plugs or conductors of the several sets are also so arranged that the conductors in some of the sets occupy different radial lines from those occupied by the conductors of another set. The conductors of the different sets may be arranged in various ways, and any desired number of sets may be employed; but in any case there will be adjacent sets in which the conductors are so located with respect to each other that a radial line through the center of a conductor of one set will not pass through the center of a conductor of the other set.

In Fig. 9 the motor $A^6$ has an armature B, like that shown in Fig. 1, and a field having cheeks or pole-pieces surrounded by field-coils $a$ and recessed, as at $t$, for enabling it to receive a closed-circuited starting-coil in the form of a solid ring or conductor $t^3$, which embraces one-half of the cheek, as clearly indicated in Figs. 9 to 11. The edges of each cheek are slightly rounded. The electrical arrangement of the coils $a$ with their line-switch or cut-off and the relative positions of the closed-circuit starting-rings $t^3$ are clearly indicated in Figs. 11 and 12. The rounded edges of the pole-pieces or cheeks enable the armature to start more readily and to more easily reach synchronism than when said edges or corners are square and cause the magnetic fields to be sharply defined.

What is claimed as new, and desired to be secured by Letters Patent of the United States, is—

1. In an alternating-current motor, the combination with a set of field-poles, a closed-circuit armature having an iron core which, adjacent to its periphery, is divided into sections on substantially radial lines, said sections being always located unsymmetrically with reference to the field-poles, substantially as described, whereby at no time will any two pairs of coöperating poles have magnetic circuits which are precisely alike in magnetic conductivity through adjacent portions of the core.

2. In an alternating-current motor, the combination of a set of field-poles, and a set of longitudinal plugs, in an armature, serving as closed-circuit conductors, said poles and plug-conductors being located unsymmetrically with reference to each other, and at no time, whether at rest or in motion, having any two adjacent plugs (on different radial lines) occupying the same position with relation to the adjacent pole or poles, as that occupied by any other two similar adjacent plugs, with relation to their adjacent pole or poles, substantially as described.

3. An alternating-current-motor armature, substantially as hereinbefore described, provided with a set of closed circuits, afforded by longitudinal plugs and diametrical copper heads which are solidly incorporated with an iron drum or core, said plugs being arranged in concentric rows, the plugs in some of said rows occupying different radial lines from those occupied by the plugs in other rows.

4. A closed-circuit armature, composed of an iron core, copper heads, and longitudinal copper plugs embedded in said core and heads, arranged in one or more rows concentric with the axis, and all united by solder, and constituting a practically solid integral structure, substantially as described.

5. A squirrel-cage armature having sets of armature-conductors in which the conductors of adjacent sets are so located with respect to each other that a radial line through the center of a conductor of one set does not pass through the center of a conductor of the other set.

6. An armature composed of a core of magnetic material, circular end connections of conducting material, longitudinal plugs or conductors embedded in said core, and in said end connections, the said plugs and end connections being united by solder.

7. An armature composed of a core of magnetic material, end connections of conducting material, longitudinal plugs or conductors embedded in said core, and in said end connections, the said plugs and end connections being so united as to be practically integral.

8. An armature composed of a core of magnetic material, circular end connections of conducting material and longitudinal plugs embedded in the magnetic material and with their ends embedded in said end connections.

9. An alternating-current motor having a toothed inducing member and a toothed induced member the number of teeth in the two members being so related to each other as to have no common divisor greater than one.

10. An alternating-current motor having a toothed inducing member and a toothed induced member the number of teeth of the two members being so chosen with respect to each other that a tooth on one member bears to the nearest adjacent tooth on the other member a relation different from that between another tooth on the first member and the nearest adjacent tooth on the other member.

11. In an alternating-current motor, the combination with the inducing member, of a squirrel-cage armature having its conductors so located about its periphery, as to present to the polar projections of the inducing member different relations respectively between the conductor, or conductors, adjacent to one polar projection and the conductor, or conductors, adjacent to the next adjacent polar projection.

12. In an alternating-current motor, the combination of inducing and induced members, one of which is provided with polar projections and the other with conductors which form the seat of induced currents, the conductors being so arranged as to produce, with every variation in the relative position of the inducing and induced members, a relation between one polar projection and the conductor or conductors adjacent thereto which is different from the relation existing between the next adjacent polar projection and the conductor or conductors adjacent to said last-mentioned polar projection.

13. A dynamo-electric machine having its two relatively-rotating members provided with teeth, the numbers of teeth on the two members being related to each other in such a manner as to produce substantially uniform magnetic resistance of the magnetic circuit between the two members in all the relative positions assumed by the said members during operation of the machine.

14. In a dynamo-electric machine, the combination of an inducing member provided with exciting-coils and an induced member provided with permanently-short-circuited conductors prime in number to the number of exciting-coils.

15. In an alternating-current induction-motor, the combination of a field member having numerous pole-faces, and an armature provided with a number of conductors indivisible by the number of pole-faces of the field or having no large common divisor therewith.

16. In an alternating-current induction-motor, the combination of a field member having numerous pole-faces and an armature having its conductors so arranged that the number of pole-faces of the armature is indivisible by the number of pole-faces of the field or has no large common divisor therewith.

In witness whereof we have hereunto set our hands this 9th day of November, 1900.

CARL EICKEMEYER,
MARY T. EICKEMEYER,
RUDOLF EICKEMEYER, JR.,
*Executors of the late Rudolf Eickemeyer, deceased.*

Witnesses:
ARTHUR A. BUCK,
JAMES D. IVERS.